(12) United States Patent
Tsuruga et al.

(10) Patent No.: US 11,556,082 B2
(45) Date of Patent: Jan. 17, 2023

(54) INTERMEDIARY TRANSFER BELT, MANUFACTURING METHOD OF THE INTERMEDIARY TRANSFER BELT, AND IMAGE FORMING APPARATUS

(71) Applicant: CANON KABUSHIKI KAISHA, Tokyo (JP)

(72) Inventors: Ryosuke Tsuruga, Abiko (JP); Toshiyuki Yoshida, Yokohama (JP); Jun Ohira, Moriya (JP); Akeshi Asaka, Kashiwa (JP); Hiroto Sugimoto, Toride (JP); Takanori Ueno, Nagareyama (JP); Koji Sato, Moriya (JP); Midai Suzuki, Kashiwa (JP); Atsushi Hori, Matsudo (JP); Kaoru Okamoto, Kamagaya (JP); Megumi Uchino, Tokyo (JP); Kazuhisa Shirayama, Abiko (JP); Naoto Kameyama, Tokyo (JP); Kiyonori Soutome, Moriya (JP); Shigeo Kuroda, Nagoya (JP); Akira Okano, Kawasaki (JP); Hiroshi Tominaga, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 850 days.

(21) Appl. No.: 16/507,220

(22) Filed: Jul. 10, 2019

(65) Prior Publication Data
US 2020/0019093 A1    Jan. 16, 2020

(30) Foreign Application Priority Data

Jul. 13, 2018    (JP) .............................. JP2018-133763

(51) Int. Cl.
*G03G 15/16*    (2006.01)
*B29B 7/90*    (2006.01)
(Continued)

(52) U.S. Cl.
CPC ............. *G03G 15/162* (2013.01); *B29B 7/90* (2013.01); *B29D 23/00* (2013.01);
(Continued)

(58) Field of Classification Search
CPC .................................................... G03G 15/162
See application file for complete search history.

(56) References Cited

U.S. PATENT DOCUMENTS 5,021,321 A    6/1991    Fukui et al.
5,171,657 A    12/1992    Kagami et al.
(Continued)

FOREIGN PATENT DOCUMENTS

JP    2005-112942 A    4/2005
JP    2006-292826    10/2006
(Continued)

OTHER PUBLICATIONS

U.S. Appl. No. 16/426,069, Takanori Ueno, filed May 30, 2019.

*Primary Examiner* — Carla J Therrien
(74) *Attorney, Agent, or Firm* — Venable LLP

(57) ABSTRACT

An intermediary transfer belt having surface resistivity ρs of $1\times10^9$ Ω/square or more and volume resistivity ρv of $1\times10^{12}$ Ω·cm or less includes a thermoplastic resin material containing carbon black. The carbon black contained in the thermoplastic resin material has a weight ratio of 22.5-28.5 weight % and include first carbon black and second carbon black. The first carbon black of the carbon black contained in the thermoplastic resin material has a weight ratio of 50-90 weight % and dibutyl phthalate absorption of 93-127 ml/100 g, and the second carbon black of the carbon black contained in the thermoplastic resin material has a weight ratio of 10-50 weight % and dibutyl phthalate absorption of 36-79 ml/100 g.

7 Claims, 3 Drawing Sheets

(51) Int. Cl.
  *B29D 23/00*   (2006.01)
  *B29K 507/04*   (2006.01)
  *B29K 101/12*   (2006.01)

(52) U.S. Cl.
  CPC ...... *B29K 2101/12* (2013.01); *B29K 2507/04* (2013.01); *B29K 2995/0005* (2013.01)

(56) References Cited

U.S. PATENT DOCUMENTS

| | | | |
|---|---|---|---|
| 5,258,281 A | 11/1993 | Tanaka et al. | |
| 5,258,282 A | 11/1993 | Kagami et al. | |
| 5,262,295 A | 11/1993 | Tanaka et al. | |
| 5,415,974 A | 5/1995 | Kotayama et al. | |
| 5,424,174 A | 6/1995 | Motokazu et al. | |
| 5,468,584 A | 11/1995 | Go et al. | |
| 5,482,814 A | 1/1996 | Ooi et al. | |
| 5,486,440 A | 1/1996 | Kashizaki et al. | |
| 5,488,461 A | 1/1996 | Go et al. | |
| 5,529,889 A | 6/1996 | Ueda et al. | |
| 5,543,286 A | 8/1996 | Ueno et al. | |
| 5,547,831 A | 8/1996 | Fukui et al. | |
| 5,695,898 A | 12/1997 | Go et al. | |
| 6,044,243 A * | 3/2000 | Hara | G03G 15/162 430/125.33 |
| 7,229,730 B2 | 6/2007 | Ohira et al. | |
| 7,229,731 B2 | 6/2007 | Aoki et al. | |
| 8,962,133 B2 | 2/2015 | Sato et al. | |
| 10,261,429 B2 | 4/2019 | Asaka et al. | |
| 10,338,486 B2 | 7/2019 | Abe et al. | |
| 2003/0118927 A1* | 6/2003 | Nakamura | G03G 5/142 430/65 |
| 2004/0183883 A1* | 9/2004 | Suzuki | G03G 5/0578 347/118 |
| 2005/0207788 A1* | 9/2005 | Bandou | G03G 15/1685 399/302 |
| 2006/0014090 A1* | 1/2006 | Shiino | G03G 5/06142 430/59.1 |
| 2006/0045578 A1* | 3/2006 | Ichizawa | G03G 15/1685 399/302 |
| 2006/0194132 A1 | 8/2006 | Hosoi et al. | |
| 2007/0020450 A1 | 1/2007 | Kitamura | |
| 2013/0149540 A1 | 6/2013 | Sato | |
| 2017/0363992 A1* | 12/2017 | Sasaki | G03G 15/162 |
| 2019/0072865 A1 | 3/2019 | Ohira et al. | |

FOREIGN PATENT DOCUMENTS

| | | |
|---|---|---|
| JP | 2007-219137 A | 8/2007 |
| JP | 2010-78663 A | 4/2010 |
| JP | 2012-097193 | 5/2012 |
| JP | 2013-88728 A | 5/2013 |
| JP | 2014-81603 A | 5/2014 |
| JP | 2017-40871 A | 2/2017 |
| JP | 2017-126017 | 7/2017 |
| JP | 2018-4719 A | 1/2018 |

* cited by examiner (a)

(b)

INTERMEDIARY TRANSFER BELT, MANUFACTURING METHOD OF THE INTERMEDIARY TRANSFER BELT, AND IMAGE FORMING APPARATUS

FIELD OF THE INVENTION AND RELATED ART

The present invention relates to an intermediary transfer belt for use with an image forming apparatus, such as a copying machine, a printer or a facsimile machine, using an electrophotographic type or an electrostatic recording type, and relates to a manufacturing method of the intermediary transfer belt and an image forming apparatus including the intermediary transfer belt.

Conventionally, for example, in an image forming apparatus using the electrophotographic type, an intermediary transfer type in which an image is outputted by primary transferring a toner image onto an intermediary transfer belt at a primary transfer portion and thereafter by secondary transferring the toner image onto a recording material such as paper at a secondary transfer portion has been known.

As the intermediary transfer belt, an intermediary transfer belt of which electric resistance value is adjusted to a desired electric resistance value by adding an electroconductive agent into a resin material has been proposed (Japanese Laid-Open Patent Application (JP-A) 2012-097193).

Surface resistivity of the intermediary transfer belt may preferably be high in general. This is because when the surface resistivity of the intermediary transfer belt is excessively low, a primary transfer bias is not applied at only a primary transfer portion where a primary transfer roller or the like is provided and causes disturbance of the toner image (hereinafter referred to as "scattering") and abnormal discharge due to transfer of the toner image at a portion other than the primary transfer portion. On the other hand, when volume resistivity of the intermediary transfer belt is excessively high, after a secondary transfer bias is applied at a secondary transfer portion, surface electric charges of the intermediary transfer belt does not readily attenuate. When a subsequent primary transfer operation is performed while the electric charges on the intermediary transfer belt do not sufficiently attenuate, before a photosensitive drum and the intermediary transfer belt contact each other, the toner image on the photosensitive drum is influenced by residual electric charges on the intermediary transfer belt. Then, a part of the toner image causes image non-uniformity when the toner image is transferred onto the intermediary transfer belt, so that there is a possibility of an occurrence of an image defect (hereinafter referred to as "ghost").

From the above-described reason, it is required that only the surface resistivity of the intermediary transfer belt is increased without changing the volume resistivity of the intermediary transfer belt. However, it is difficult to realize this only by controlling an amount of the electroconductive agent added to the resin material. As another means, it would be considered that an anisotropy (a ratio between surface resistivity and volume resistivity) of resistivity is controlled by improving a dispersing property of the electroconductive agent added to the resin material. In order to improve the dispersing property of the electroconductive agent added to the resin material, the electroconductive agent may only be required to be mixed with the resin material in a state in which apparent viscosity of the resin material is lowered. However, in a thermoplastic resin material as disclosed in JP-A 2012-097193, there is a need to heat the resin material to several hundreds of 0° C. or more. Heat decomposition and deterioration of the resin material progress by retention of the resin material at high temperature, and an agglomerated material generates and forms a local projection, so that a spot image generates. Further, as another means for improving the dispersing property, there is also a method in which an electroconductive agent having a small particle size (i.e., a small dibutylphthalate (DBP) absorption) is selected. However, the apparent viscosity is increased by an increase in addition amount required for desired resistivity, so that shearing heat generation (amount) occurring in a mixing step increases, and therefore, the heat decomposition and deterioration occur similarly. For that reason, there is a limit on improvement of the dispersing property in the method of mixing the resin material at high temperature and in the method of decreasing the particle size of the electroconductive agent.

SUMMARY OF THE INVENTION

Accordingly, a principal object of the present invention is to provide an intermediary transfer belt capable of suppressing scattering and a ghost while suppressing heat deterioration of a resin material and to provide a manufacturing method of the intermediary transfer belt and an image forming apparatus including the intermediary transfer belt.

According to an aspect of the present invention, there is provided an intermediary transfer belt having surface resistivity $\rho s$ of $1 \times 10^9$ Ω/square or more and volume resistivity $\rho v$ of $1 \times 10^{12}$ Ω·cm or less, the intermediary transfer belt comprising: a thermoplastic resin material containing carbon black, wherein the carbon black contained in the thermoplastic resin material has a weight ratio of 22.5-28.5 weight % and include first carbon black and second carbon black, and wherein the first carbon black of the carbon black contained in the thermoplastic resin material has a weight ratio of 50-90 weight % and dibutyl phthalate absorption of 93-127 ml/100 g, and the second carbon black of the carbon black contained in the thermoplastic resin material has a weight ratio of 10-50 weight % and dibutyl phthalate absorption of 36-79 ml/100 g.

According to another aspect of the present invention, there is provided a manufacturing method of an intermediary transfer belt having surface resistivity $\rho s$ of $1 \times 10^9$ Ω/square or more and volume resistivity $\rho v$ of $1 \times 10^{12}$ Ω·cm or less, the manufacturing method comprising: a first mixing step of obtaining a mixture by mixing a resin material containing the thermoplastic resin material and an electroconductive filler containing at least two kinds of carbon black different in DBP absorption in a temperature environment in which a temperature of the resin material is less than 150° C.; a second mixing step of obtaining a mixture by mixing the mixture obtained in the first mixing step in a temperature environment in which the temperature of the resin material is 240° C. or more and 420° C. or less; and a molding step of preparing a layer by melting the mixture obtained in the second mixing step at a temperature which is a melting temperature or more of the resin material and then by molding the melted mixture in a cylindrical tube shape.

According to a further aspect of the present invention, there is provided an image forming apparatus comprising an image bearing member configured to bear a toner image and the above-described intermediary transfer belt configured to carry and convey the toner image primary-transferred from the image bearing member to secondary-transfer the toner image onto a recording material.

Further features of the present invention will become apparent from the following description of exemplary embodiments with reference to the attached drawings.

Figure 2:
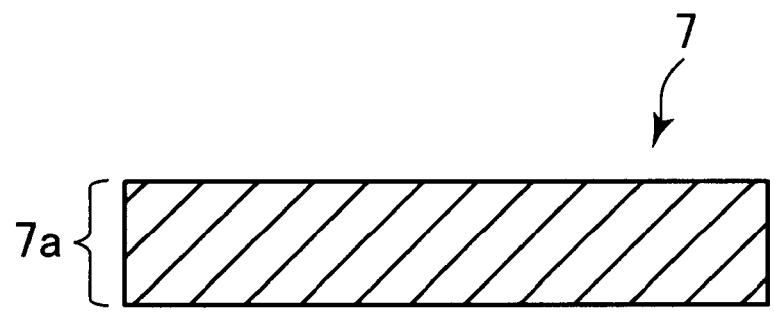
Figure 2:
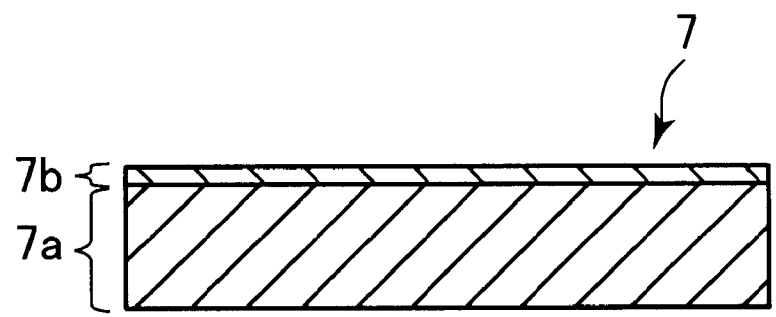

Parts (a) and (b) of FIG. 2 are schematic sectional views each showing an example of a layer structure of an intermediary transfer belt.

Figure 3:
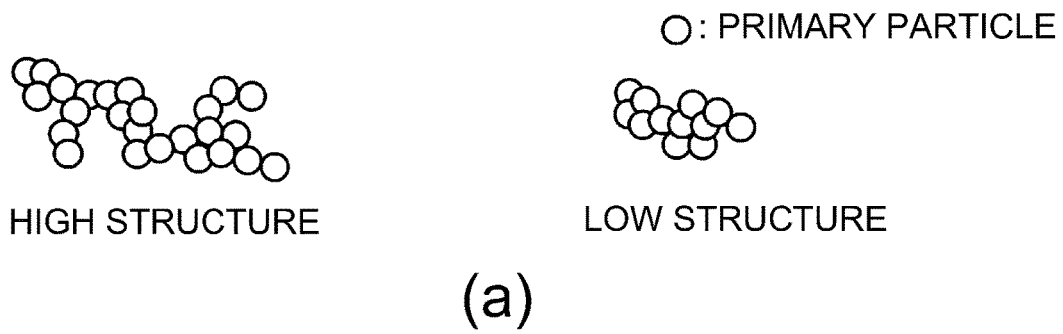
Figure 3:
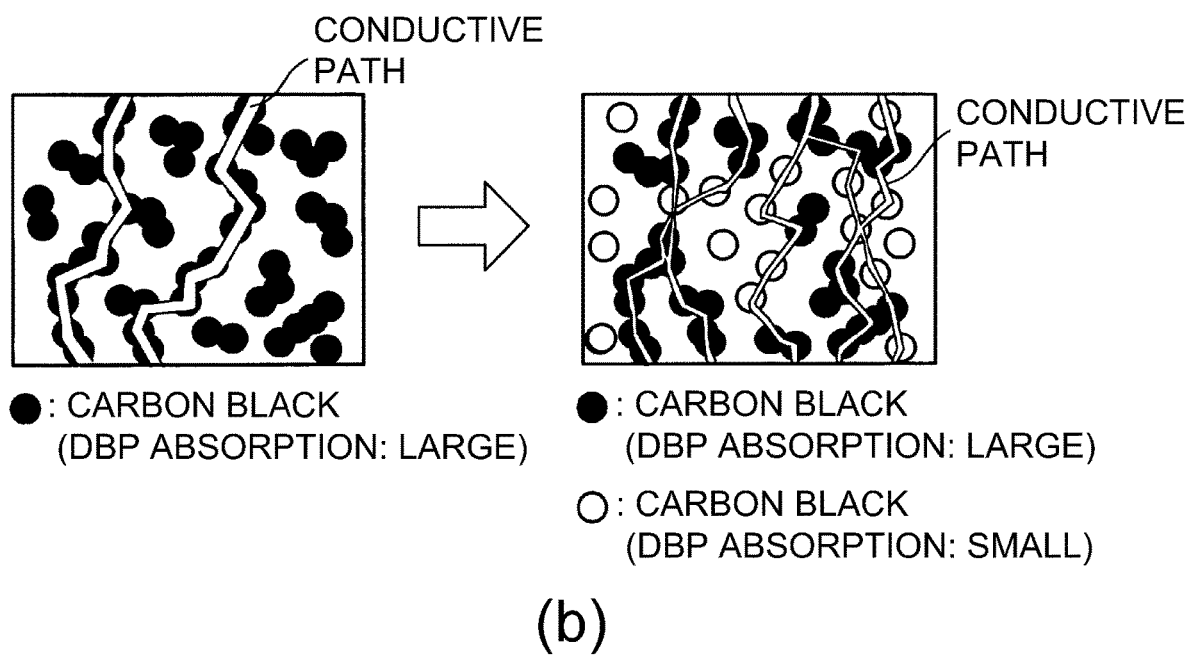

Parts (a) and (b) of FIG. 3 are schematic views for illustrating action of two kinds of carbon black different in DBP absorption.

DESCRIPTION OF EMBODIMENTS

In the following, an intermediary transfer belt according to the present invention, a manufacturing method of the intermediary transfer belt, and an image forming apparatus including the intermediary transfer belt will be specifically described with reference to the drawings.

First Embodiment

1. Image Forming Apparatus

Figure 1:
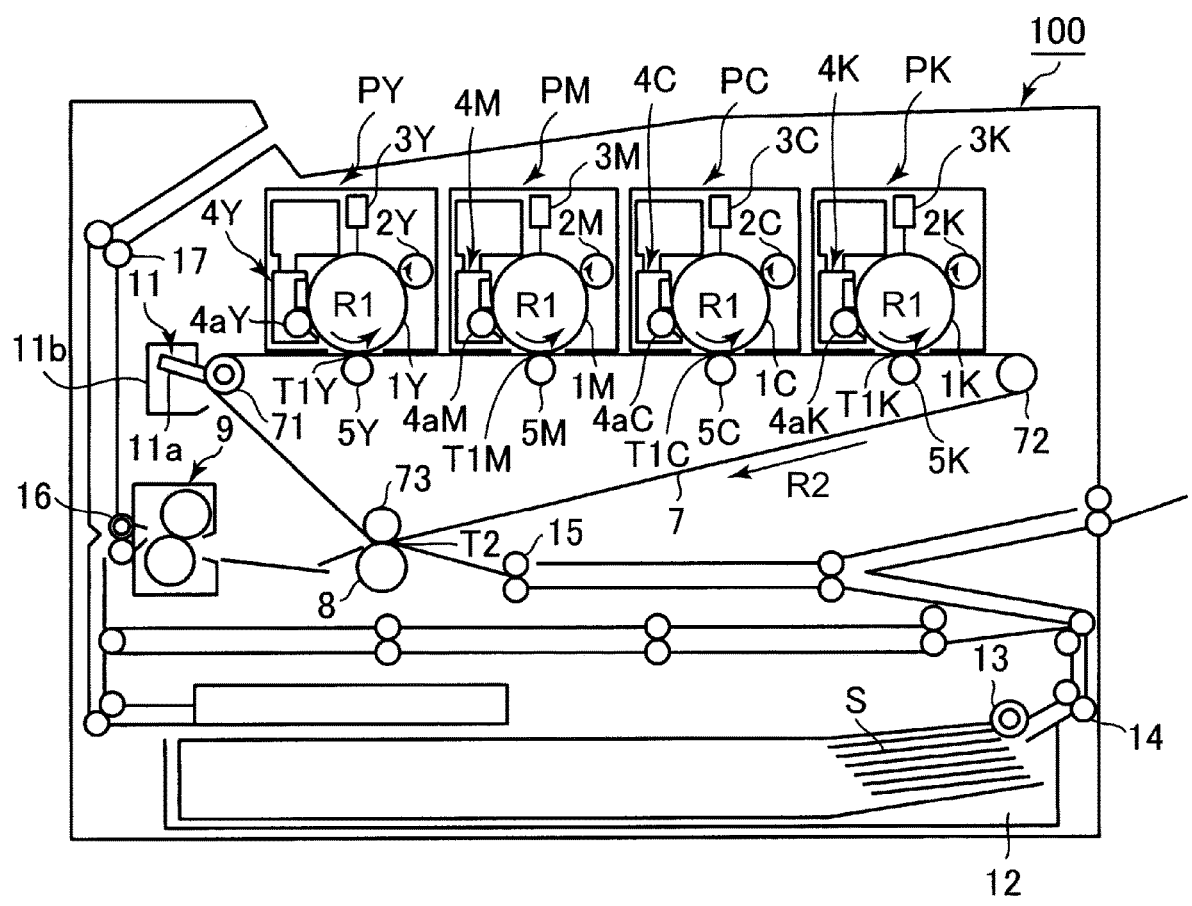
FIG. 1 is a schematic sectional view of an image forming apparatus.

First, an embodiment of an image forming apparatus using an intermediary transfer belt according to the present invention will be described. FIG. 1 is a schematic sectional view of an image forming apparatus 100 of this embodiment. The image forming apparatus 100 of this embodiment is a color laser printer of a tandem type which is capable of forming a full-color image by using an electrophotographic type and which employs an intermediary transfer type.

The image forming apparatus 100 includes first to fourth image forming portions PY, PM, PC and PK as a plurality of image forming portions. These first to fourth image forming portions PY, PM, PC and PK are disposed in a named order along a movement direction of a flat portion (image transfer surface) of an intermediary transfer belt 7 described later. As regards elements having the same or corresponding functions and constitutions of the first to fourth image forming portions PY, PM, PC and PK, these elements are collectively described in some instances by omitting suffixes Y, M, C and K of reference numerals or symbols representing the elements for associated colors. In this embodiment, the image forming portion P is constituted by including a photosensitive drum 1, a charging roller 2, an exposure device 3, a developing device 4 and a primary transfer roller 5 which are described later.

The image forming portion P includes the photosensitive drum 1 which is a drum-type (cylindrical) photosensitive member (electrophotographic photosensitive member) as an image bearing member. The photosensitive drum 1 is formed on an aluminum cylinder as a base material by laminating a charge generating layer, a charge transporting layer and a surface protecting layer in a named order. The photosensitive drum 1 is rotationally driven in an arrow R1 direction (counterclockwise direction) in FIG. 1. A surface of the photosensitive drum 1 is electrically charged uniformly to a predetermined polarity (negative in this embodiment) and a predetermined potential by the charging roller 2 which is a roller-shaped charging member as a charging means. During a charging step, to the charging roller 2, a predetermined charging bias (charging voltage) containing a negative DC component is applied. The charged surface of the photosensitive drum 1 is subjected to scanning exposure depending on image information by the exposure device (laser scanner) 3 as an exposure means, so that an electrostatic (latent) image is formed on the photosensitive drum 1.

The electrostatic image formed on the photosensitive drum 1 is developed (visualized) by supplying toner as a developer by the developing device 4 as a developing means. During a developing step, to a developing roller 4a as a developer carrying member provided in the developing device 4, a predetermined developing bias (developing voltage) containing a negative DC component is applied. In this embodiment, on an exposed portion (image portion) of the photosensitive drum 1 lowered in absolute value of a potential by being exposed to light after the photosensitive drum surface is charged uniformly, the toner charged to the same polarity (negative in this embodiment) as a charge polarity of the photosensitive drum 1.

The intermediary transfer belt 7 constituted by an endless belt as an intermediary transfer member is provided so as to oppose the four photosensitive drums 1. The intermediary transfer belt 7 is extended around and stretched by, as a plurality of stretching rollers, a driving roller 71, a tension roller 72, and a secondary transfer opposite roller 73 under predetermined tension. The intermediary transfer belt 7 is rotated (circulated and moved) in an arrow R2 direction (clockwise direction) in FIG. 1 in contact with the photosensitive drum 1 by rotationally driving the driving roller 71. On an inner peripheral surface side of the intermediary transfer belt 7, corresponding to an associated one of the photosensitive drums 1, the primary transfer roller 5 which is a roller-shaped primary transfer member as a primary transfer means is disposed. The primary transfer roller 5 is pressed toward the photosensitive drum 1 via the intermediary transfer belt 7, so that a primary transfer portion (primary transfer nip) T1 where the photosensitive drum 1 and the intermediary transfer belt 7 contact each other is formed. As described above, the toner image formed on the photosensitive drum 1 is primary-transferred onto the rotating intermediary transfer belt 7 by the action of the primary transfer roller 5 at the primary transfer portion T1. During a primary transfer step, to the primary transfer roller 5, a primary transfer bias (primary transfer voltage) which is a DC voltage of an opposite polarity (positive in this embodiment) to a normal charge polarity (charge polarity during the developing step) of the toner is applied.

On an outer peripheral surface side of the intermediary transfer belt 7, at a position opposing the secondary transfer opposite roller 73, a secondary transfer roller 8 which is a roller-shaped secondary transfer member as a secondary transfer means is disposed. The secondary transfer roller 8 is pressed toward the secondary transfer opposite roller 73 via the intermediary transfer belt 7, so that a secondary transfer portion (secondary transfer nip) T2 where the intermediary transfer belt 7 and the secondary transfer roller 8 contact each other is formed. As described above, the toner image formed on the intermediary transfer belt 7 is secondary transferred onto a recording material (sheet, transfer-receiving material) S such as paper (sheet) sandwiched and fed between the intermediary transfer belt 7 and the secondary transfer opposite roller 8 by the action of the secondary transfer roller 8 at the secondary transfer portion T2. During a secondary transfer step, to the secondary transfer roller 8, a secondary transfer bias (secondary transfer voltage) which is the DC voltage of the opposite polarity to the normal charge polarity of the toner is applied. In secondary transfer, in general, in order to ensure sufficient transfer efficiency, a transfer voltage of several kV is applied. The recording material S is supplied from a cassette 12, in which the recording materials S are accommodated, toward a feeding path by a pick-up roller 13. The recording material S supplied to the feeding path is fed to the secondary transfer portion T2 by a feeding roller pair 14 and a registration roller pair 15 while being timed to the toner image on the intermediary transfer belt 7.

The recording material S on which the toner image is transferred is conveyed to a fixing device 9 as a fixing means. The fixing device 9 heats and presses the recording material S carrying thereon an unfixed toner image and fixes (melts, sticks) the toner image on the recording material S. The recording material S on which the toner image is fixed is discharged (outputted) to an outside of an apparatus main assembly of the image forming apparatus 100 by a conveying roller pair 16, a discharging roller pair 17 and the like.

Toner (primary transfer residual toner) remaining on the surface of the photosensitive drum 1 without being transferred onto the intermediary transfer belt 7 in the primary transfer step is collected simultaneously with development by the developing device 4 also functioning as a photosensitive member cleaning means. Further, toner (secondary transfer residual toner) remaining on the surface of the intermediary transfer belt 7 without being transferred onto the recording material S in the secondary transfer step is collected by being removed from the surface of the intermediary transfer belt 7 by a belt cleaning device 11 as an intermediary transfer member cleaning means. The belt cleaning device 11 is disposed upstream (at a position opposing the driving roller 71 in this embodiment) of the mostupstream primary transfer portion T1Y provided downstream of the secondary transfer portion T2 with respect to a rotational direction of the intermediary transfer belt 7. The belt cleaning device 11 scrapes off the secondary transfer residual toner of the surface of the rotating intermediary transfer belt 7 by a cleaning blade as a cleaning member provided so as to contact the surface of the intermediary transfer belt 7, and accommodates the toner in a collecting container 11b.

Thus, in an image forming operation, an electrical transfer process of the toner image from the photosensitive drum 1 onto the intermediary transfer belt 7 and therefrom the intermediary transfer belt 7 onto the recording material S is repetitively carried out. Further, by repeating the image formation on many recording materials S, the electrical transfer process is further repetitively carried out.

2. Intermediary Transfer Member

The intermediary transfer belt 7 as the intermediary transfer member may also be a laminated member which includes at least a base layer (base material) and which is constituted by a plurality of layers further including a surface layer and the like. Parts (a) and (b) of FIG. 2 are schematic sectional views each for illustrating an example of a layer structure of the intermediary transfer belt 7. As shown in part (a) of FIG. 2, the intermediary transfer belt 7 may be constituted by a single layer (in this embodiment, also in the case of the single layer, the layer is referred to as the "base layer" in some instances). Further, as shown in part (b) of FIG. 2, the intermediary transfer belt 7 may also be constituted by at least two layers consisting of a base layer 7a and a surface layer 7b provided on the base layer 7a. Incidentally, for example, another layer such as an intermediary layer may also be provided between the base layer 7a and the surface layer 7b. As specifically described below, the base layer 7a is semiconductive film in which an electroconductive agent is contained in a resin material.

2-1. Base Layer

As a resin material of the base layer, it is possible to use a resin material (thermoplastic resin material) such as polyphenylene sulfide (PPS), polyetherimide (PEI) or polyether ether ketone (PEEK). Particularly, the intermediary transfer belt 7 is required to have a performance such that the intermediary transfer belt 7 is not extended even under a tension load for a long term and that a surface thereof is not readily abraded (worn) by rubbing with the cleaning blade. For that reason, as the resin material of the base layer, polyether ether ketone (PEEK) is suitable. Further, these resin material may also be used by selecting and mixing two or more kinds thereof as needed.

<Electroconductive Filler>

For the purpose of imparting electroconductivity to the base layer and the like, in the resin material, at least one kind of an electroconductive filler such as carbon black or metal fine particles is added. Of these materials, carbon black is preferred from the viewpoint of a mechanical property. As regards the carbon black, there are various names. Specifically, the carbon black includes Ketjen black, furnace black, acetylene black, thermal black, gas black, and the like.

As the carbon black, various known substances can be used. Specifically, it is possible to use Ketjen black, furnace black, acetylene black, thermal black, gas black, and the like. Among these, the acetylene black and the furnace black which is small in impurity and frequency of contamination defect in the case where the carbon black is molded together with the above-described thermoplastic resin material in a film shape and which easily provides desired electroconductivity may preferably be used. As the acetylene black, it is possible to specifically cite "DENKA BLACK" series (manufactured by Denka Co., Ltd.), "MITSUBISHI Conductive Filler" series (manufactured by Mitsubishi Chemical Corp.), "VULCAN" series (manufactured by Cabot Corp.), "Printex" series (manufactured by Degussa), and "SRF" (manufactured by ASAHI CARBON Co., Ltd.). As the furnace black, it is possible to specifically cite "TOCA-BLACK" series (manufactured by Tokai Carbon Co., Ltd.), "Asahi carbon black" series (manufactured by ASAHI CARBON Co., Ltd.), and "Niteron" series (manufactured by NIPPON STEEL Carbon Co., Ltd.).

Further, of these kinds of carbon black, it is preferable that two or more kinds of carbon black different in DBP absorption are selected and mixed in the resin material. In the case where an intermediary transfer belt is obtained by mixing only one kind of carbon black having relatively large DBP absorption in the resin material, it is difficult to provide an intermediary transfer belt having surface resistivity $\rho s$ of $1\times10^9$ $\Omega$/square or more and volume resistivity $\rho v$ of $1\times10^{12}$ $\Omega\cdot cm$ or less while ensuring a dispersing property. Further, in the case where an intermediary transfer belt is obtained by mixing only one kind of carbon black having relatively small DBP absorption in the resin material, although the dispersing property can be ensured, there is a need to increase a content of the carbon black. For that reason, apparent viscosity of the resin material increases and shearing heat generation occurring in a mixing step increases, and therefore, thermal decomposition and deterioration occur in some instances. As a result, an agglomerated material is formed in the intermediary transfer belt and results in a local projection, so that a spot image (white spot) generates in some instances. Further, there is the need to increase the content of the carbon black, and therefore, it is not preferable also from the viewpoint of flex resistance or mechanical strength. From the above-described reasons, two kinds or more of carbon black different in DBP absorption are selected and mixed in the resin material, so that it is possible to provide an intermediary transfer belt excellent in flex resistance and mechanical strength while ensuring the dispersing property and retaining the resistivity of the intermediary transfer belt in a desired range.

Here, the DBP absorption (number) is an index of a complicated agglomeration form (structure) due to chemical or physical bond between carbon black particles and is represented by an amount (ml) of dibutyl phthalate (DBP) capable of being contained per 100 g of carbon black.

Part (a) of FIG. 3 is a schematic view of the structures of carbon black. The structure is a connection of minimum structure units (primary particles) of carbon black and has the influence on exhibition of electroconductivity of a resin complex containing the carbon black. The DBP absorption is an index indicating a degree of complexity and means that a lower structure is formed with smaller DBP absorption (i.e., a higher structure is formed with large DBP absorption). In the case where the carbon black is dispersed in the resin material, the electroconductivity is lower with a lower structure (i.e., the electroconductivity is higher with a higher structure). As specifically described later, it is required that the surface resistivity of the intermediary transfer belt is made high in order to suppress scattering. However, in order to make the surface resistivity high, when the volume resistivity is also made high correspondingly, ghost is liable to generate. Therefore, it turned out that at least two kinds of carbon black different in DBP absorption are contained in the base layer, whereby the volume resistivity is easily increased while suppressing the volume resistivity to a range in which the ghost does not generate. This would be considered because as shown in part (b) of FIG. 3, between electroconductive paths (left figure) formed by the structure of carbon black having large DBP absorption, electroconductive paths (right figure) are formed by carbon black having small DBP absorption in a relatively small amount. That is, only by the carbon black having relatively large DBP absorption (typically, 90 ml/100 g or more), it is difficult to sufficiently increase the surface resistivity while suppressing the volume resistivity to a sufficiently low level, so that it becomes difficult to compatibly realize suppression of the ghost and suppression of the scattering. On the other hand, only by the carbon black having relatively small DBP absorption (typically, less than 80 ml/100 g), an amount of the carbon black necessary to realize desired resistivity increases and causes the heat deterioration (spot image) of the resin material as described above. Further, the flex resistance or the mechanical strength becomes insufficient in some cases. Although an evaluation test result will be described and shown later specifically, it is preferable that of two kinds of carbon black contained in the base layer of the intermediary transfer belt, first carbon black having DBP absorption of 93-127 ml/100 g has a weight ratio of 50-90 weight %. Further, it is preferable that of the two kinds of carbon black contained in the base layer of the intermediary transfer belt, second carbon black having DBP absorption of 36-79 ml/100 g has a weight ratio of 10-50 weight %. When the weight ratios of the first carbon black and the second carbon black are smaller or larger than the above-described ranges, it becomes difficult to cause the resistivity of the intermediary transfer belt to fall within a desired range in some instances.

<Content of Electroconductive Filler>

An amount (content) of the electroconductive filler added in the base layer is selection in consideration that the electroconductivity necessary for the base layer can be imparted and in consideration of heat deterioration of the resin material constituting the base layer, and of flex resistance, mechanical strength and thermal conductivity of the base layer.

When the content of the electroconductive filler is excessively large, the resistivity of the base layer becomes small, and therefore, it is difficult to obtain the intermediary transfer belt having the surface resistivity $\rho s$ of $1.0 \times 10^9$ $\Omega$/square or more. Further, when the content of the electroconductive filler is excessively large, apparent viscosity of the resin material increases, and therefore, in order to ensure the dispersing property of the electroconductive filler, heating of the resin material to several hundreds of ° C. or more is required and thus is not preferred. From the above and from the viewpoint of the mechanical strength, it is preferable that the content of the electroconductive filler is 28.5 weight % or less, more preferably 26.5 weight % or less.

On the other hand, when the content of the electroconductive filler is excessively small, the resistivity of the base layer becomes large, and it is difficult to satisfactorily maintain a dispersion state of the electroconductive filler in the base layer. For that reason, it is difficult to obtain the intermediary transfer belt having surface resistivity $\rho s$ of $1 \times 10^9$-$2 \times 10^{12}$ $\Omega$/square ($1 \times 10^9$ $\Omega$/square or more and $2 \times 10^{12}$ $\Omega$/square or less) and volume resistivity $\rho v$ of $1 \times 10^{12}$ $\Omega \cdot cm$ or less. Accordingly, it is preferable that the electroconductive filler content is 22.5 wt. % or more, more preferably 24.5 weight % or more.

That is, the electroconductive filler content is 22.5-28.5 weight % (22.5 weight % or more and 28.5 weight % or less), preferably 24.5-26.5 weight %.

Incidentally, the electroconductive filler content is represented by a weight % per a weight of an entire solid content of the base layer (i.e., by a weight ratio).

<Ion Conductive Agent (Material)>

For the purpose of lowering an electric resistance of a resin component of the base layer and the like purpose, in the resin material, in addition to the electroconductive filler, an ion conductive agent (material) may also be contained as an electroconductive agent (material). As the ion conductive agent, in addition to lithium salts or potassium salts, it is possible to cite ionic liquids of pyridine-based, alicyclic amine-based, and aliphatic amine-based, and the like. Of these materials, from the viewpoint of the dispersing property, the ionic liquid is preferred.

2-2. Manufacturing Method of Base Layer

The base layer is formed by a manufacturing method including the following steps:

(1) a first mixing step in which the resin material and the electroconductive filler are mixed with each other in a temperature environment in which a temperature of the resin material is less than 150° C. and thus a mixture is obtained, (2) a second mixing step in which the mixture obtained in the first mixing step is further mixed in a temperature environment in which the temperature of the resin material is 240-420° C. (240° C. or more and 420° C. or less), and (3) a molding step in which the mixture obtained in the second mixing step is melted at a temperature which is a melting temperature or more of the resin material and then is molded in a cylindrical tube shape.

In the following, the respective steps (1), (2) and (3) will be described.

<First Mixing Step>

In the first mixing step, polyether ether ketone (PEEK) which is the resin material and carbon black which is the electroconductive filler are mixed by a fluid-type mixer in a temperature environment of less than a glass transition point of the resin material, so that a mixture is obtained. As the fluid-type mixer, although it is possible to use various known mixers provided with a mechanism for mixing the resin material and the electroconductive filler by utilizing streaming movement of a solid, specifically, it is possible to use mixers such as Henschel mixer, ribbon mixer, and planetary mixer. Among these, it is preferable that the Henschel mixer is used from the viewpoint of mixing efficiency. Further, a number of rotations, a processing time, throughout and the like of the fluid-type mixer are needed to be appropriately selected depending on a material.

<Second Mixing Step>

In the second mixing step, the mixture obtained in the first mixing step is further mixed in a temperature environment of not less than the glass transition point of the resin material. As a mixer used in the second mixing step, a double (twin)-screw kneader provided with two screws in a barrel or a cylinder can be used. The mixture supplied through a supply hole of a supplying portion generates shearing heat and is melt-mixed by friction among the barrel or the cylinder, the screws and the mixture while moving toward a die by rotation of the screws. At that time, when a temperature in the barrel or the cylinder exceeds 420° C., the PEEK (resin material) is thermally decomposed or thermally deteriorated (degraded). For that reason, there is a need to carry out control so that the temperature of the mixture does not become excessively high by carrying out external cooling and temperature adjustment of the barrel or the cylinder, adjustment of a rotational speed of the screws, and the like. On the other hand, when the temperature in the barrel or the cylinder is below 240° C., the PEEK does not from a stable melted state, and therefore, a dispersion state of the carbon black which is the electroconductive filler becomes non-uniform, so that it is difficult to obtain a mixture excellent in mechanical, electrical and optical characteristics. At a free end portion of the double-screw kneader, a strand die is provided in general, so that the mixture is extruded in a bar shape, and after air cooling, the mixture is cut in pellets and thus a pellet-shaped mixture is prepared.

Here, in the case where the PEEK resin material and the carbon black are mixed only in the second mixing step without using the first mixing step, the dispersion state of the carbon black becomes non-uniform, so that it is difficult to obtain the mixture excellent in the mechanical, electrical and optical characteristics. Further, when a good dispersion state of the carbon black is intended to be obtained only by the second mixing step, it is required to supply larger shearing energy, so that the PEEK is thermally decomposed or thermally deteriorated by shearing heat generation in some instances.

<Molding Step>

In the molding step, the mixture obtained in the second mixing step is molded in a cylindrical tube-like belt shape. For molding, depending on the resin material used, it is possible to select a method such as extrusion molding or inflation molding, but from the viewpoint of productivity, it is preferable that cylindrical extrusion molding is employed.

As an extruder in the extrusion molding, it is possible to use either of a single-screw extruder provided with one screw in a barrel or a cylinder and a multi-screw extruder provided with two or more screws in the barrel or the cylinder. The above-described pellet-shaped mixture supplied through a supply hole of a supplying portion is supplied with thermal energy from the barrel or the cylinder and mechanical energy from the screw(s) while moving toward a die by rotation of the screw(s). A cylindrical die is provided at a free end portion of the extruder, and the mixture is molded in a cylindrical tube shape by being extruded downward through the cylindrical die and by being drawn from a lower portion. Incidentally, the present invention is not limited thereto, and a thickness of the base layer is about 10-500 μm in general, and typically about 50-200 μm.

2-3. Surface Layer

The surface layer is constituted principally by a binder resin (material), perfluoropolyether (PFPE), a dispersing agent and another additive. In the following, respective components will be described.

<Binder Resin>

The binder resin is used for permitting dispersion of the PEEK therein, ensuring adhesiveness to the base layer and ensuring a characteristic of mechanical strength.

As examples of the binder resin, it is possible to cite styrene resin, acrylic resin, methacrylic resin, epoxy resin, polyester resin, polyether resin, and polyvinyl butyral. It is also possible to use mixtures of these resin materials. Among these binder resins, particularly, the methacrylic resin or the acrylic resin (these resins is collectively referred to as "acrylic-based resin") may preferably be used.

Specifically, first, a polymerizable monomer for forming the acrylic-based resin, a solvent, perfluoropolyether, and a dispersing agent are uniformly dispersed by a wet dispersing device, so that a dispersion liquid is obtained. The dispersion liquid is coated on the base layer by a coating method such as bar coating or spray coating. Then, the solvent is removed from the coated dispersion liquid, and thereafter, the polymerizable monomer is polymerized by heat curing or by electron beam irradiation or ultraviolet irradiation, whereby the surface layer is formed.

At this time, a polymerization initiator for carrying out the polymerization may appropriately be used. As the polymerization initiator, it is possible to cite a radical polymerization initiator such as alkylphenone or acrylphosphine oxide, a cationic polymerization initiator such as aromatic sulfonium salt, and a nifedipine anion polymerization initiator. Specifically, as the radical polymerization initiator, it is possible to cite Irgague series (manufactured by BASF SE), and as the cationic polymerization initiator, it is possible to cite SP series (manufactured by ADEKA Corp.).

Further, in addition, known additives such as the above-described electroconductive agents, antioxidants, leveling agents, cross-linking agents and fire retardant additive may also be appropriately mixed and used. Further, mixing of a solid filler may also be appropriately performed depending on a necessary characteristic such as strength reinforcement.

The content of the binder resin may preferably be 20.0 weight % or more and 95.0 weight % or less, more preferably be 30.0 weight % or more and 90.0 weight % or less.

As regards a film thickness of the surface layer, it is possible to appropriately provide a desired film thickness by adjusting a film forming condition (for example, a solid content concentration, a film forming speed or the like). The film thickness of the surface layer may preferably be 1 μm or more when abrasion and wear of the surface layer in an actual machine durability condition are taken into account, and may preferably be 20 μm or less when flex resistance during stretching of the intermediary transfer belt is taken into account, more preferably be 10 μm or less.

Next, a physical property of the binder resin of the surface layer will be described. The binder resin of the surface layer may preferably be a solid, and a glass transition temperature of the binder resin may preferably be an operation (use) temperature range or more of the intermediary transfer belt (i.e., the image forming apparatus), substantially 40° C. or more), more preferably be 50° C. or more.

<Perfluoropolyether (PFPE)>

Perfluoropolyether is an oligomer or a polymer, which includes perfluoroalkylene ether as a recurring unit. As the recurring unit which is perfluoroalkylene ether, it is possible to cite recurring units such as perfluoromethylene ether, perfluoroethylene ether and perfluoropropylene ether. Specifically, it is possible to cite "DEMNUM" manufactured by DAIKIN INDUSTRIES, Ltd., "Krytox" manufactured by DuPont, and "Fomblin" manufactured by SOLVAY.

<Dispersing Agent>

The surface layer may preferably contain a dispersing agent for dispersing the perfluoropolyether. The surface layer contains such a dispersing agent, so that a dispersion state of the PFPE in the surface layer can be stabilized. As the dispersing agent, a compound including a site having an affinity for a perfluoroalkyl chain and hydrocarbon, i.e., a compound having amphilicity which possesses fluorophilic and fluorophobic properties, such as a surfactant, an amphipatic block copolymer and an amphipatic graft copolymer may preferably be used. Among these, the following copolymers are particularly preferred:

(i) a block copolymer obtained by co-polymerizing a vinyl monomer having a fluoroalkyl group with an acrylate or a methacrylate, or (ii) a comb-(shaped) graft copolymer obtained by copolymerizing an acrylate or methacrylate having a fluoroalkyl group with a methacrylate macromonomer having a polymethyl methacrylate side chain.

As the block copolymer (i), it is possible to cite MODIPER F200, F210, F2020, F600 and FT600 manufactured by NOF Corp. Further, as the comb-graft copolymer (ii), it is possible to cite Aron GF-150, GF-300 and GF-400 manufactured by TOAGOSEI Co., Ltd. as a fluorine-based graft polymer.

In order to contain a large amount of PFPE in the binder resin with a $CF_3$ site, a $CF_2$ site and CF site in a small amount, it is preferable that the dispersing agent is used.

<Another Additive>

To the surface layer, electroconductivity may also be imparted depending on a characteristic required for the intermediary transfer belt. In order to impart the electroconductivity to the surface layer, an electroconductive filler may also be contained in the surface layer.

As the electroconductive filler, known electron conductive materials (electron conductive agents, electroconductive fine particles) and ion conductive materials (ion conductive agents) can be used. As the electron conductive materials, it is possible to cite carbon black, carbon nanotube, antimony-doped tin oxide, antimony-doped zinc, phosphor-doped zinc oxide, aluminum-doped zinc oxide, gallium-doped zinc oxide, polyaniline, polythiophene and polypyrrole. Further, as the ion conductive materials, it is possible to cite potassium sulfonate and lithium disulfonate.

2-4. Manufacturing Method of Surface Layer

The surface layer may preferably be formed by a manufacturing method including the following steps:

(1) a mixing step of obtaining a mixture by mixing perfluoropolyether, a polymerizable monomer for forming a binder resin, a dispersing agent and a polymerization initiator, (2) an application step of applying the mixture obtained in the mixing step onto a semiconductive belt (base layer), and (3) a polymerization step of polymerizing the polymerizable monomer in the mixture by irradiating the mixture applied on the semiconductive belt in the application step, with ultraviolet rays.

First, in the mixing step, the perfluoropolyether, the polymerizable monomer for forming the binder resin, the dispersing agent and the polymerization initiator are mixed by a stirring homogenizer and an ultrasonic homogenizer, so that a mixture is obtained. At this time, a solvent, an ultraviolet curing agent, an electroconductive agent and an additive may also be further added to the mixture. Here, as the solvent, it is possible to use MEK (methyl ethyl ketone), MIB (methyl isobutyl ketone), IPA (isopropyl alcohol) and ethylene glycol. Further, as the ultraviolet curing agent, it is possible to use a photopolymerization initiator and a thermal polymerization initiator. Further, as an additive, an electroconductive agent, filler particles, a coloring agent and a leveling agent.

Next, in the application step, the resultant mixture is applied onto the semiconductor belt by spray coating or dipping. Further, after application, the mixture is dried at 60-90° C. and then the solvent is distilled off.

Next, in the polymerization step, the polymerizable monomer in the mixture is polymerized by irradiating the mixture applied on the base layer with ultraviolet rays by an ultraviolet irradiation device. By performing such a step, the surface layer can be formed. As a light source of ultraviolet rays, it is possible to use a high-pressure mercury lamp, a metal halide lamp and an LED ultraviolet lamp. An integrated irradiation light quantity can be appropriately changed by a kind of the monomer and a kind and an amount of the photopolymerization initiator.

2-5. Treatment for Easy Adhesion of Base Layer

Before the above-described application step, treatment for easy adhesion (bonding) of the base layer may also be performed in order to enhance an adhesive property between the surface layer and the base layer. Of the treatment for easy adhesion, ultraviolet irradiation, plasma treatment and corona treatment are preferred, and the corona treatment is further preferred. In the corona treatment, typically, an outer peripheral surface of the base layer is subjected to corona discharge while conveying the base layer at a predetermined speed (film speed) by a predetermined jig. As regards the corona treatment, it has been known that a discharge amount ($W \cdot min/m^2$) represented by the following equation correlates with a physical value.

$$\text{Discharge amount} = P \div L \div v$$

In the equation, P represents electric discharging power (W), L represents a discharging electrode length (m), and v represents the film speed (m/min).

Incidentally, although a result of an evaluation test will be described specifically later, the discharge amount in a corona treatment step may preferably be 50 $W \cdot min/m^2$ or more and 200 $W \cdot min/m^2$ or less. When the discharge amount is smaller or larger than this range, it becomes difficult to adjust the resistivity of the intermediary transfer belt in a desired range.

Thus, the manufacturing method of the intermediary transfer belt may include a surface layer forming step of forming the surface layer on the outer peripheral surface of the base layer obtained in the molding step. Further, the manufacturing method of the intermediary transfer belt may include the corona treatment step of subjecting the outer peripheral surface of the base layer obtained in the molding step to the corona discharge before the surface layer forming step. Further, the manufacturing method of the intermediary transfer belt may include a preparing step of preparing paint to be applied onto the outer peripheral surface of the base layer in the surface layer forming step. Further, this preparing step may include a first preparing step of preparing an intermediate of paint containing the resin material and a second preparing step of adding an electroconductive agent and a solvent of the intermediate to the intermediate. Incidentally, although the result of the evaluation test will be described specifically later, a weight ratio of a sum of the electroconductive agent and the solvent to the intermediate may preferably be 3.7-22.3 weight %. When this weight ratio is smaller or larger than this range, it becomes difficult to adjust the resistivity of the intermediary transfer belt in a desired range.

2-6. Electric Resistance Value of Intermediary Transfer Belt

Next, electrical properties of the intermediary transfer belt will be described. In the image forming apparatus of an intermediary transfer type, at the primary transfer portion, the charged toner is moved from the photosensitive drum onto the intermediary transfer belt under application of an electric field, and therefore, surface resistivity and volume resistivity of the intermediary transfer belt are important physical properties affecting an image quality.

As a result of study by the present inventors, it turned out that in order to satisfactorily improve thin line reproducibility (toner scattering at the primary transfer portion) of the toner, there is a need that the surface resistivity of the intermediary transfer belt is $1.0 \times 10^9$ Ω/square or more. This is due to the following reason. When the surface resistivity of the intermediary transfer belt is smaller than $1.0 \times 10^9$ Ω/square, a high electric field is applied to the intermediary transfer belt even at a portion upstream of a nip, which is the primary transfer portion where the photosensitive drum and the intermediary transfer belt are in contact with each other, with respect to a movement direction of the intermediary transfer belt. As a result, the toner on the photosensitive drum is transferred onto the intermediary transfer belt at a portion in front of the nip, so that a position of the toner is deviated compared with the case where the toner is transferred at the nip.

Further, as a result of study by the present inventors, it turned out that there is a need that the volume resistivity of the intermediary transfer belt is $1 \times 10^{12}$ Ω·cm or less. This is due to the following reason. In the case where the volume resistivity of the intermediary transfer belt is higher than $1 \times 10^{12}$ Ω·cm, an image defect (ghost) due to flying of the toner, at the portion upstream of the nip (primary transfer portion), resulting from a history of electric charges on the intermediary transfer belt. On the other hand, by making the volume resistivity of the intermediary transfer belt not more than $1 \times 10^{12}$ Ω·cm, a time required to attenuate the electric charges on the surface of the intermediary transfer belt is reduced, so that the image defect does not occur.

2-7. Measuring Method of Electric Resistance Value

As a measuring device of the electrical properties, "Hiresta UP" manufactured by Mitsubishi Chemical Analytech Co., Ltd. The surface resistivity was measured under application of a voltage of 1000 V by an URS probe in a measuring mode of "surface resistivity" in a state in which a table made of PTFE attached to the measuring device is placed as a substrate for an inside (inner peripheral surface 9 of the semiconductor belt and the semiconductor belt is placed on the table with an outside (outer peripheral surface) thereof as a measuring surface, and the surface resistivity was measured in an environment of a temperature of 23° C. and a relative humidity of 50% RH. The volume resistivity was measured under application of a voltage of 100 V by an UR probe in a measuring mode of "volume resistivity" in a state in which a table made of metal attached to the measuring device is placed similarly as the substrate for the semiconductor belt and was measured similarly in the environment of 23° C. and 50% RH. Further, even in the case where the intermediary transfer belt comprises a plurality of layers, the measuring methods of the surface resistivity and the volume resistivity are similar to those described above.

2-8. DBP Absorption (Number)

In the case where the DBP absorption is measured from a state of the carbon black alone, measurement was carried out using an absorption tester "S-500" manufactured by Asahisouken Corp. according to JIS6217. Into a measuring chamber, 15 g of a measuring sample (carbon black) is charged, and then a torque was measured in setting of a dropping speed of 4 ml/min of DBP (dibutyl phthalate) and a rotor rotation number of 125 rpm. The DBP absorption is defined by a DBP drop amount and a sample amount in which the measured torque is 70% of a peak torque value.

2-9. Evaluation Method of DBP Absorption of Carbon Black Contained in Base Layer In order to acquire the DBP absorption of the carbon black contained in the intermediary transfer belt from a state of the intermediary transfer belt, the DBP absorption can be determined in the following manner.

The carbon black contained in the intermediary transfer belt can be observed through a transmission electron microscope (TEM). Preparation of a thin piece of a sample can be carried out by a known method. For example, the preparation of the thin piece of the sample can be made by a focus ion beam, a diamond knife or the like. In this embodiment, the sample was cut with "ULTRACUT-S" manufactured by Leica Microsystems, so that an about 40 µm-thick cut piece sample for observation was obtained. As the transmission electron microscope (TEM), "H-7100FA" manufactured by Hitachi Ltd. was used. Then, a TEM image was obtained in a measuring condition in which a TE-mode, an acceleration voltage of 100 kV and magnification such that one side of an image is 3 µm or less are set. A minimum structural unit of the carbon black is primary aggregate in which primary particles are connected with each other, and therefore, from the obtained TEM image, a distribution of a maximum Feret diameter of the carbon black primary aggregate is analyzed. The maximum Feret diameter corresponds to a length of a long side of a rectangle circumscribed with the carbon black primary aggregate.

For analyzing the maximum Feret diameter from the obtained TEM image, a known image analysis software can be used. For example, as a representative image analysis software, it is possible to cite a trade name "WinROOF" manufactured by MITANI Corp. and a trade name "ImagePro" manufactured by NIPPON ROPER K.K. In this embodiment, the image analysis software (trade name "WinROOF" manufactured by MITANI Corp.) was used. As regards the obtained TEM image, the carbon black primary aggregate portion is binarized and extracted, so that it is possible to analyze a maximum Feret diameter distribution of the carbon black primary aggregate scattered in the image. At this time, it is well-known that a peak top position of the maximum Feret diameter and the DBP absorption which is an index of a size (magnitude) of the carbon black primary aggregate correlate with each other. By checking the number and position of peak tops of the maximum Feret diameter, it is possible to determine kinds of carbon black different in DBP absorption and DBP absorption numbers of the respective kinds of carbon black.

The carbon black added in the intermediary transfer belt in the present invention includes first carbon black having DBP absorption of 93-127 ml/100 g and second carbon black having DBP absorption of 36-79 ml/100 g, and the peak top positions of the first carbon black and the second carbon black are 100-160 nm and 40-80 nm, respectively.

2-10. Measuring Method of Apparent Viscosity

Apparent viscosity of a resin composition of the base layer of the intermediary transfer belt was measured in accordance with JIS K7199 by using a capillary rheometer ("CAPIROGRAPH 1D", manufactured by Toyo Seiki Seisakusho Ltd.). The apparent viscosity (Pa·s) was measured in a state in which a set temperature is 380° C. and 20 g of a melted resin composition sample is extruded through a die of 1 mm in diameter and 10 mm in length at an extrusion speed which is a shearing speed of 100 mm/sec.

Incidentally, as regards the above-described apparent viscosity, the resin composition of the base layer of the intermediary transfer belt refers to a resin composition used in the molding step after the kneading (after the second mixing step in the present invention).

2-11. Evaluation Method of Resin Deterioration Degree (ΔTm)

A resin deterioration degree was evaluated by performing cycle I to cycle IV in a named order with use of a differential scanning calorimetry analyzer (DSC measuring device) ("Q-1000", manufactured by TA Instruments). A peak top value in temperature rise was taken as a melting point. In the following temperature conditions, when melting points in cycle II and cycle IV are Tm(II) and Tm(IV), respectively, a resin deterioration degree (ΔTm) was defined as the following equation (1):

$$\Delta Tm = Tm(II) - Tm(IV) \quad (1).$$

Sample: 5-20 mg, preferably 10-15 mg of resin composition

Measuring method: a sample is placed in an aluminum pan, and a blank aluminum pan is used as a reference.

Temperature Conditions:
(Cycle I)
Temperature rise I (20° C. to 400° C., temperature rise rate of 10° C./min., nitrogen atmosphere)
Retention for 5 min. at 400° C.
Temperature drop I (400° C. to 20° C., temperature drop rate of 10° C./min., nitrogen atmosphere)
(Cycle II)
Temperature rise II (20° C. to 400° C., temperature rise rate of 10° C./min., nitrogen atmosphere)
Retention for 5 min. at 400° C.
Temperature drop II (400° C. to 20° C., temperature drop rate of 10° C./min., nitrogen atmosphere)
(Cycle III)
Temperature rise III (20° C. to 450° C., temperature rise rate of 10° C./min., nitrogen atmosphere)
Retention for 120 min. at 450° C.
Temperature drop III (450° C. to 20° C., temperature drop rate of 10° C./min., nitrogen atmosphere)
(Cycle IV)
Temperature rise IV (20° C. to 400° C., temperature rise rate of 10° C./min., nitrogen atmosphere)
Retention for 5 min. at 400° C.
Temperature drop IV (400° C. to 20° C., temperature drop rate of 10° C./min., nitrogen atmosphere)

Incidentally, as regards the above-described resin deterioration degree, the resin composition of the base layer of the intermediary transfer belt refers to a resin composition used in the molding step after the kneading (after the second mixing step in the present invention). Further, the cycle I is a crystallization cancel process of the resin composition, the cycle II is a measuring process (melting point measurement) before a deterioration process, the cycle III is the deterioration process, and the cycle IV is a measuring process (melting point measurement) after the deterioration process.

2-12. Extracting Method of Carbon Black in Intermediary Transfer Belt

A cut piece of the intermediary transfer belt is dissolved in 20 ml of concentrated sulfuric acid, so that a cut piece solution is obtained. The cut piece solution is neutralized with an appropriate alkaline solution (for example, 1N-aqueous sodium hydroxide), so that a neutralized liquid in which the cut piece is dissolved is obtained. The neutralized liquid is diluted two times with water, and thereafter, in a process in which the diluted liquid passes through a column in liquid chromatography, the two kinds of carbon black different in DBP absorption can be separated by a difference in migration speed. Further, from a weight of a residue portion obtained by drying the diluted liquid, it is possible to predict weight parts of the carbon black contained in the intermediary transfer belt.

3. Embodiments and Comparison Examples

Next, structures and manufacturing methods of intermediary transfer belts in Embodiments according to the present invention and in Comparison Example as comparison objects, which are used in the evaluation test described later will be described.

Tables 1 and 2 appearing hereinafter include various measurement results of the intermediary transfer belts prepared in Embodiments 1 to 16 (Table 1) and Comparison Examples 1 to 15 (Table 2), which will be described later. Incidentally, in Tables 1 and 2, for convenience, $1.0 \times 10^{10}$ in represented by 1.0E+10, for example.

Embodiment 1

(Preparation of Base Layer)

In Embodiment 1, the following carbon black was used.

First carbon black: Nitron #200 IN/T-NS (DBP absorption=93-127 ml/100 g, primary particle size=31 nm) manufactured by NIPPON STEEL Carbon Co., Ltd.)

Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| | |
|---|---|
| First carbon black | 18.5 weight parts |
| Second carbon black | 7.0 weight parts |
| PEEK ("450G", Victrex plc.) | 74.5 weight parts |

An operation condition and processing condition of the Henschel mixer are as follows.
Blade rotation number: 1515 rpm
Throughput: 30 kg
Processing time: 5 min.
Processing temperature: 50° C.

The above-processed mixture (A) was mixed under the following condition by using a biaxial kneader ("PCM43", manufactured by K.K. IKEGAI), so that a mixture (B) was prepared (second mixing step).
Extrusion rate: 6 kg/h
Screw rotation number: 225 rpm
Ballel control temperature: 330° C.

The resultant mixture (B) was subjected to molding under the following condition by using a single-screw extruder (manufactured by Research Laboratory of Plastic Technology Co., Ltd.) provided with a spiral cylindrical die at a free end portion thereof, so that a base layer of an intermediary transfer belt was obtained.

Extrusion rate: 6 kg/h
Die temperature: 380° C.

Embodiment 2

In Embodiment 2, an intermediary transfer belt was prepared in the same manner as in Embodiment 1 except that the mixing amounts of the first carbon black, the second carbon black and the PEEK were changed. The electroconductive agents (first carbon black, second carbon black) used in Embodiment 2 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)
Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 16.3 weight parts |
|---|---|
| Second carbon black | 6.2 weight parts |
| PEEK ("450G", Victrex plc.) | 77.5 weight parts |

Embodiment 3

In Embodiment 3, an intermediary transfer belt was prepared in the same manner as in Embodiment 1 except that the mixing amounts of the first carbon black, the second carbon black and the PEEK were changed. The electroconductive agents (first carbon black, second carbon black) used in Embodiment 3 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)
Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 20.7 weight parts |
|---|---|
| Second carbon black | 7.8 weight parts |
| PEEK ("450G", Victrex plc.) | 71.5 weight parts |

Embodiment 4

In Embodiment 4, an intermediary transfer belt was prepared in the same manner as in Embodiment 1 except that a pellet-shaped mixture was prepared by changing the screw rotation number to 290 rpm in the second mixing step. In this embodiment, the mixture was prepared by changing the screw rotation number, but the preparing method is not limited thereto.

Embodiment 5

In Embodiment 5, an intermediary transfer belt was prepared in the same manner as in Embodiment 1 except that the mixing amounts of the first carbon black, the second carbon black and the PEEK were changed. The electroconductive agents (first carbon black, second carbon black) used in Embodiment 5 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)
Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 11.25 weight parts |
|---|---|
| Second carbon black | 11.25 weight parts |
| PEEK ("450G", Victrex plc.) | 77.5 weight parts |

Embodiment 6

In Embodiment 6, an intermediary transfer belt was prepared in the same manner as in Embodiment 1 except that the mixing amounts of the first carbon black, the second carbon black and the PEEK were changed. The electroconductive agents (first carbon black, second carbon black) used in Embodiment 6 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)
Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 25.65 weight parts |
|---|---|
| Second carbon black | 2.85 weight parts |
| PEEK ("450G", Victrex plc.) | 71.5 weight parts |

Embodiment 7

In Embodiment 7, on the intermediary transfer belt (base layer) obtained in Embodiment 1, the following surface layer was formed. This surface layer is formed of an acrylic resin material containing electroconductive fine particles, and in the acrylic resin material, perfluoroether is contained.

(Preparation of Paint of Surface Layer)

An intermediate (H) was prepared by stirring the following ingredients by homogenizer.

| | |
|---|---|
| Methyl ethyl ketone (Kishida Chemical Co., Ltd.) | 16.5 weight parts |
| Butyl acetate (Kishida Chemical Co., Ltd.) | 16.5 weight parts |
| Aronix M405 (TOAGOSEI Co., Ltd.) | 25.7 weight parts |
| FLUOROLINK MD700 (Solvey Specialty Polymers Japan K.K.) | 13.5 weight parts |
| Aron GF-420 (TOAGOSEI Co., Ltd.) | 25.7 weight parts |
| Irgacure 184 (BASF SE) | 1.8 weight parts |
| Irgacure 369 (BASF SE) | 0.7 weight part |

In the intermediate (H), electroconductive agents were added in the following mixing amounts and were stirred by "Mix rotor", so that paint (I) was prepared.

| | |
|---|---|
| Intermediate (H) | 79 weight parts |
| CELNAX CX-Z410K (Nissan Chemical Corp.) | 3 weight parts |
| CELNAX CX-Z210IP (Nissan Chemical Corp.) | 6 weight parts |
| Isopropyl alcohol (Kishida Chemical Co., Ltd.) | 12 weight parts |

Incidentally, a mixing ratio (weight ratio) of the electroconductive agents (CELNAX CX-Z410K and CELNAX CX-Z210IP) to the sum of the electroconductive agents (CELNAX CX-Z410K and CELNAX CX-Z210IP) and the intermediate (H) in this embodiment is 10.2 weight %.

(Preparation of Surface Layer)

An outer peripheral surface of the base layer was subjected to corona treatment in a condition of a discharge amount of 100 W·min/m² by using a corona treater (manufactured by KASUGA DENKI, Inc.) (treatment for easy adhesion). Thereafter, the paint (I) was spray-coated on the outer peripheral surface of the base layer and the solvent was vaporized for 1 min. in a drying oven at 70° C., and then curing reaction was carried out through UV curing. The outer peripheral surface of the resultant belt was abraded by an abrasive film with WA abrasive grain (manufactured by Mipox Corp.).

Embodiment 8

In Embodiment 8, a surface layer was formed on the intermediary transfer belt (base layer) obtained in Embodiment 2 in the same manner as in Embodiment 7.

Embodiment 9

In Embodiment 9, a surface layer was formed on the intermediary transfer belt (base layer) obtained in Embodiment 3 in the same manner as in Embodiment 7.

Embodiment 10

In Embodiment 10, a surface layer was formed on the intermediary transfer belt (base layer) obtained in Embodiment 4 in the same manner as in Embodiment 7.

Embodiment 11

In Embodiment 11, a surface layer was formed on the intermediary transfer belt (base layer) obtained in Embodiment 5 in the same manner as in Embodiment 7.

Embodiment 12

In Embodiment 12, a surface layer was formed on the intermediary transfer belt (base layer) obtained in Embodiment 6 in the same manner as in Embodiment 7.

Embodiment 13

In Embodiment 13, an intermediary transfer belt (in which a base layer is the intermediary transfer belt of Embodiment 2) was prepared in the same manner as in Embodiment 8 except that the discharge amount of the corona treatment in the preparation of the surface layer was changed to 200 W·min/m².

Embodiment 14

In Embodiment 14, an intermediary transfer belt (in which a base layer is the intermediary transfer belt of Embodiment 3) was prepared in the same manner as in Embodiment 9 except that the discharge amount of the corona treatment in the preparation of the surface layer was changed to 50 W·min/m².

Embodiment 15

In Embodiment 15, an intermediary transfer belt (in which a base layer is the intermediary transfer belt of Embodiment 2) was prepared in the same manner as in Embodiment 8 except that the mixing ratio of the electroconductive agents to the sum of the electroconductive agents and the intermediate was changed. In this embodiment, the electroconductive agents were added to the intermediate (H) in the following mixing ratio, and the resultant mixture was stirred by the mix rotor, so that paint (I) was prepared.

| | |
|---|---|
| Intermediate (H) | 79 weight parts |
| CELNAX CX-Z410K (Nissan Chemical Corp.) | 2 weight parts |
| CELNAX CX-Z210IP (Nissan Chemical Corp.) | 1 weight part |
| Isopropyl alcohol (Kishida Chemical Co., Ltd.) | 18 weight parts |

Incidentally, a mixing ratio (weight ratio) of the electroconductive agents (CELNAX CX-Z410K and CELNAX CX-Z210IP) to the sum of the electroconductive agents (CELNAX CX-Z410K and CELNAX CX-Z210IP) and the intermediate (H) in this embodiment is 3.7 weight %.

Embodiment 16

In Embodiment 16, an intermediary transfer belt (in which a base layer is the intermediary transfer belt of Embodiment 3) was prepared in the same manner as in Embodiment 9 except that the mixing ratio of the electroconductive agents to the sum of the electroconductive agents and the intermediate was changed. In this embodiment, the electroconductive agents were added to the intermediate (H) in the following mixing ratio, and the resultant mixture was stirred by the mix rotor, so that paint (I) was prepared.

| | |
|---|---|
| Intermediate (H) | 73 weight parts |
| CELNAX CX-Z410K (Nissan Chemical Corp.) | 14 weight parts |
| CELNAX CX-Z210IP (Nissan Chemical Corp.) | 7 weight parts |
| Isopropyl alcohol (Kishida Chemical Co., Ltd.) | 6 weight parts |

Incidentally, a mixing ratio (weight ratio) of the electroconductive agents (CELNAX CX-Z410K and CELNAX CX-Z210IP) to the sum of the electroconductive agents (CELNAX CX-Z410K and CELNAX CX-Z210IP) and the intermediate (H) in this embodiment is 22.3 weight.

Comparison Example 1

In Comparison Example 1, an intermediary transfer belt was prepared in the same manner as in Embodiment 1 except that the mixing amounts of the first carbon black, the second carbon black and the PEEK were changed. The electroconductive agents (first carbon black, second carbon black) used in Comparison Example 1 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)

Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 15.95 weight parts |
|---|---|
| Second carbon black | 6.05 weight parts |
| PEEK ("450G", Victrex plc.) | 78.0 weight parts |

Comparison Example 2

In Comparison Example 2, an intermediary transfer belt was prepared in the same manner as in Embodiment 1 except that the mixing amounts of the first carbon black, the second carbon black and the PEEK were changed. The electroconductive agents (first carbon black, second carbon black) used in Comparison Example 2 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)

Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 21.0 weight parts |
|---|---|
| Second carbon black | 8.0 weight parts |
| PEEK ("450G", Victrex plc.) | 71.0 weight parts |

Comparison Example 3

In Comparison Example 3, an intermediary transfer belt was prepared in the same manner as in Embodiment 1 except that the pellet-shaped mixture was prepared by changing the screw rotation number in the second mixing step to 300 rpm.

Comparison Example 4

In Comparison Example 4, an intermediary transfer belt was prepared in the same manner as in Embodiment 1 except that the first mixing step was not performed.

Comparison Example 5

In Comparison Example 5, an intermediary transfer belt was prepared in the same manner as in Embodiment 1 except that the mixing amounts of the first carbon black, the second carbon black and the PEEK were changed. The electroconductive agents (first carbon black, second carbon black) used in Comparison Example 5 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)

Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 12.8 weight parts |
|---|---|
| Second carbon black | 15.7 weight parts |
| PEEK ("450G", Victrex plc.) | 71.5 weight parts |

Comparison Example 6

In Comparison Example 6, an intermediary transfer belt was prepared in the same manner as in Embodiment 1 except that the mixing amounts of the first carbon black, the second carbon black and the PEEK were changed. The electroconductive agents (first carbon black, second carbon black) used in Comparison Example 6 and the mixing amounts in the first mixing step were as follows.

First carbon black: Nitron #200 IN/T-NS (DBP absorption=93-127 ml/100 g, primary particle size=31 nm) manufactured by NIPPON STEEL Carbon Co., Ltd.)

Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| First carbon black | 27.1 weight parts |
|---|---|
| Second carbon black | 1.4 weight parts |
| PEEK ("450G", Victrex plc.) | 71.5 weight parts |

Comparison Example 7

In Comparison example 7, an intermediary transfer belt was prepared in the same manner as in Embodiment 1 except that first carbon black different in DBP absorption from the first carbon black in Embodiment 1 was used as the electroconductive agent. The electroconductive agents (first carbon black, second carbon black) used in Comparison Example 7 and the mixing amounts in the first mixing step were as follows.

First carbon black: DENKA BLACK glanular product (DBP absorption=158-225 ml/100 g, primary particle size=35 nm) manufactured by Denka Co., Ltd.)

Second carbon black: TOCABLACK #7270SB (DBP absorption=36-79 ml/100 g, primary particle size=36 nm) manufactured by Tokai Carbon Co., Ltd.)

The first carbon black, the second carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| | |
|---|---|
| First carbon black | 18.5 weight parts |
| Second carbon black | 7.0 weight parts |
| PEEK ("450G", Victrex plc.) | 74.5 weight parts |

Comparison Example 8

In Comparison Example 8, a surface layer was formed on the intermediary transfer belt (base layer) obtained in Comparison Example 1 in the same manner as in Embodiment 7.

Comparison Example 9

In Comparison Example 9, a surface layer was formed on the intermediary transfer belt (base layer) obtained in Comparison Example 2 in the same manner as in Embodiment 7.

Comparison Example 10

In Comparison Example 10, an intermediary transfer belt (in which a base layer is the intermediary transfer belt of Embodiment 2) was prepared in the same manner as in Embodiment 8 except that the discharge amount of the corona treatment in the preparation of the surface layer was changed to 230 W·min/m$^2$.

Comparison Example 11

In Comparison Example 11, an intermediary transfer belt was prepared in the same manner as in Embodiment 9 except that the discharge amount of the corona treatment in the preparation of the surface layer was changed to 30 W·min/m$^2$.

Comparison Example 12

In Comparison Example 12, an intermediary transfer belt was prepared in the same manner as in Embodiment 1 except that the second carbon black was not used and that the mixing amounts of the carbon black and the PEEK were changed. The electroconductive agent (carbon black) used in Comparison Example 12 and the mixing amounts in the first mixing step were as follows.

Carbon black: Nitron #200 IN/T-NS (DBP absorption=93-127 ml/100 g, primary particle size=31 nm) manufactured by NIPPON STEEL Carbon Co., Ltd.)

The carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| | |
|---|---|
| Carbon black | 20.0 weight parts |
| PEEK ("450G", Victrex plc.) | 80.0 weight parts |

Comparison Example 13

In Comparison Example 13, an intermediary transfer belt was prepared in the same manner as in Embodiment 1 except that the second carbon black was not used and that the mixing amounts of the carbon black and the PEEK were changed. The electroconductive agent (carbon black) used in Comparison Example 13 and the mixing amounts in the first mixing step were as follows.

Carbon black: Nitron #200 IN/T-NS (DBP absorption=93-127 ml/100 g, primary particle size=31 nm) manufactured by NIPPON STEEL Carbon Co., Ltd.)

The carbon black and the resin material were mixed in the following mixing amounts by using Henschel mixer ("FM-150L/I", manufactured by NIPPON COKES & ENGINEERING Co., Ltd.), so that a mixture (A) was prepared (first mixing step).

| | |
|---|---|
| Carbon black | 23.0 weight parts |
| PEEK ("450G", Victrex plc.) | 77.0 weight parts |

Comparison Example 14

In Comparison Example 14, an intermediary transfer belt was prepared in the same manner as in Embodiment 8 except that the mixing ratio of the electroconductive agents to the sum of the electroconductive agents and the intermediate was changed. In this comparison example, the electroconductive agents were added to the intermediate (H) in the following mixing ratio, and the resultant mixture was stirred by the mix rotor, so that paint (I) was prepared.

| | |
|---|---|
| Intermediate (H) | 79 weight parts |
| CELNAX CX-Z410K (Nissan Chemical Corp.) | 0.5 weight part |
| CELNAX CX-Z210IP (Nissan Chemical Corp.) | 0.25 weight part |
| Isopropyl alcohol (Kishida Chemical Co., Ltd.) | 20.25 weight parts |

Incidentally, a mixing ratio (weight ratio) of the electroconductive agents (CELNAX CX-Z410K and CELNAX CX-Z210IP) to the sum of the electroconductive agents (CELNAX CX-Z410K and CELNAX CX-Z210IP) and the intermediate (H) in this embodiment is 0.9 weight %.

Comparison Example 15

In Comparison Example 15, an intermediary transfer belt was prepared in the same manner as in Embodiment 9 except that the mixing ratio of the electroconductive agents to the sum of the electroconductive agents and the intermediate was changed. In this comparison example, the electroconductive agents were added to the intermediate (H) in the following mixing ratio, and the resultant mixture was stirred by the mix rotor, so that paint (I) was prepared.

| | |
|---|---|
| Intermediate (H) | 72 weight parts |
| CELNAX CX-Z410K (Nissan Chemical Corp.) | 16.0 weight parts |
| CELNAX CX-Z210IP (Nissan Chemical Corp.) | 8.0 weight parts |
| Isopropyl alcohol (Kishida Chemical Co., Ltd.) | 4.0 weight parts |

Incidentally, a mixing ratio (weight ratio) of the electroconductive agents (CELNAX CX-Z410K and CELNAX CX-Z210IP) to the sum of the electroconductive agents (CELNAX CX-Z410K and CELNAX CX-Z210IP) and the intermediate (H) in this embodiment is 25.0 weight %.

4. Evaluation Test 4-1. Evaluation Method of Image

By using the image forming apparatus according to the present invention, a durability test in which A4-size sheets of plain paper ("CS068" manufactured by Canon Inc.) are continuously passed through the fixing device in a low humidity environment (23° C./5% RH) was conducted until $600 \times 10^3$ sheets were passed through the fixing device. Further, every passing of $10 \times 10^3$ sheets, each of an image X comprising a character string of Ming-style typeface in 5 pt and an image Y comprising an entire halftone black image formed by only the image forming portion PK for black was continuously formed on 5 sheets (A3-size plain paper "CS068" manufactured by Canon Inc.). The resultant images X and Y were evaluated in terms of scattering, ghost and white spot (spot image) according to the following criteria.

(Anti-Scattering)

A: With respect to the image X, even when the character string is enlarged by a microscope or the like, scattering is not observed.

B: With respect to the image X, even when the character string is enlarged by the microscope or the like, scattering is little observed.

C: With respect to the image X, when the character string is enlarged by the microscope or the like, scattering is slightly observed.

D: With respect to the image X, when the character string is enlarged by the microscope or the like, scattering is observed.

(Anti-Ghost)

A: With respect to the image Y, ghost is not observed on all the 5 sheets.

B: With respect to the image Y, ghost is slightly observed on either of the 5 sheets.

D: With respect to the image Y, ghost is observed on either of the 5 sheets.

(Anti-White-Spot)

A: With respect to the image Y, white spot of 1 mm or more in diameter is not observed on all the 5 sheets.

B: With respect to the image Y, white spot of 1 mm or more in diameter is little observed on all the 5 sheets.

C: With respect to the image Y, white spot of 1 mm or more in diameter is slightly observed on either of the 5 sheets.

D: With respect to the image Y, white spot of 1 mm or more in diameter is observed on either of the 5 sheets.

TABLE 1

| | | Base layer | | | | | | Surface layer |
|---|---|---|---|---|---|---|---|---|
| | First mixing | CB Amount (wt %) | Weight ratio of CB1 and CB2 | | DBP Absorption (ml/100 g) | | Another material | Ratio of electro-conductive agent to intermediate |
| Emb. | step | Total | CB1 | CB2 | CB1 | CB2 | Base | (%) |
| 1 | YES | 25.5 | 72.5 | 27.5 | 93-127 | 36-79 | PEEK | NO SURFACE LAYER |
| 2 | YES | 22.5 | 72.4 | 27.6 | 93-127 | 36-79 | PEEK | NO SURFACE LAYER |
| 3 | YES | 28.5 | 72.6 | 27.4 | 93-127 | 36-79 | PEEK | NO SURFACE LAYER |
| 4 | YES | 25.5 | 72.5 | 27.5 | 93-127 | 36-79 | PEEK | NO SURFACE LAYER |
| 5 | YES | 22.5 | 50 | 50 | 93-127 | 36-79 | PEEK | NO SURFACE LAYER |
| 6 | YES | 28.5 | 90 | 10 | 93-127 | 36-79 | PEEK | NO SURFACE LAYER |
| 7 | YES | 25.5 | 72.5 | 27.5 | 93-127 | 36-79 | PEEK | 10.2 |
| 8 | YES | 22.5 | 72.4 | 27.6 | 93-127 | 36-79 | PEEK | 10.2 |
| 9 | YES | 28.5 | 72.6 | 27.4 | 93-127 | 36-79 | PEEK | 10.2 |
| 10 | YES | 25.5 | 72.5 | 27.5 | 93-127 | 36-79 | PEEK | 10.2 |
| 11 | YES | 22.5 | 50 | 50 | 93-127 | 36-79 | PEEK | 10.2 |
| 12 | YES | 28.5 | 90 | 10 | 93-127 | 36-79 | PEEK | 10.2 |
| 13 | YES | 22.5 | 72.4 | 27.6 | 93-127 | 36-79 | PEEK | 10.2 |
| 14 | YES | 28.5 | 72.6 | 27.4 | 93-127 | 36-79 | PEEK | 10.2 |
| 15 | YES | 22.5 | 72.4 | 27.6 | 93-127 | 36-79 | PEEK | 3.7 |
| 16 | YES | 28.5 | 72.6 | 27.4 | 93-127 | 36-79 | PEEK | 22.3 |

| Emb. | Corona treatment (W · min/m$^2$) | Screw rotation (rpm) in 2ND mixing step | Apparent viscosity (Pa · s) | Surface resistivity ρs at URS 1000 V | Volume resistivity ρv at UR 100 V | Δ Tm |
|---|---|---|---|---|---|---|
| 1 | NO CORONA TREATMENT | 225 | 2000 | 1.0E+11 | 2.0E+10 | 6.5 |
| 2 | NO CORONA TREATMENT | 225 | 1770 | 1.5E+12 | 8.0E+11 | 5.5 |
| 3 | NO CORONA TREATMENT | 225 | 2310 | 1.0E+09 | 3.0E+08 | 6.8 |

TABLE 1-continued

|  |  |  |  |  |  |  |
|---|---|---|---|---|---|---|
| 4 | NO CORONA TREATMENT | 290 | 2310 | 6.5E+11 | 7.2E+10 | 7.5 |
| 5 | NO CORONA TREATMENT | 225 | 2100 | 1.6E+12 | 1.0E+12 | 7.0 |
| 6 | NO CORONA TREATMENT | 225 | 2200 | 1.0E+09 | 3.0E+08 | 7.4 |
| 7 | 100 | 225 | 2000 | 1.0E+11 | 5.0E+10 | 6.5 |
| 8 | 100 | 225 | 1770 | 1.5E+12 | 8.0E+11 | 5.5 |
| 9 | 100 | 225 | 2310 | 1.0E+09 | 3.0E+08 | 6.8 |
| 10 | 100 | 290 | 2310 | 2.5E+11 | 5.0E+10 | 7.0 |
| 11 | 100 | 225 | 2100 | 2.0E+12 | 1.0E+12 | 7.0 |
| 12 | 100 | 225 | 2200 | 1.0E+09 | 3.0E+08 | 7.4 |
| 13 | 200 | 225 | 1770 | 2.0E+12 | 1.0E+12 | 5.5 |
| 14 | 50 | 225 | 2310 | 1.0E+09 | 3.0E+08 | 6.8 |
| 15 | 100 | 225 | 1770 | 2.0E+12 | 1.0E+12 | 5.5 |
| 16 | 100 | 225 | 2310 | 1.0E+09 | 3.0E+08 | 6.8 |

TABLE 2

| Comp. ex. | First mixing step | Base layer CB Amount (wt %) Total | Base layer Weight ratio of CB1 and CB2 CB1 | Base layer Weight ratio of CB1 and CB2 CB2 | Base layer DBP Absorption (ml/100 g) CB1 | Base layer DBP Absorption (ml/100 g) CB2 | Base layer Another material Base | Surface layer Ratio of electro-conductive agent to intermediate (%) |
|---|---|---|---|---|---|---|---|---|
| 1 | YES | 22.0 | 72.5 | 27.5 | 93-127 | 36-79 | PEEK | NO SURFACE LAYER |
| 2 | YES | 29.0 | 72.4 | 27.6 | 93-127 | 36-79 | PEEK | NO SURFACE LAYER |
| 3 | YES | 25.5 | 72.5 | 27.5 | 93-127 | 36-79 | PEEK | NO SURFACE LAYER |
| 4 | NO | 25.5 | 72.5 | 27.5 | 93-127 | 36-79 | PEEK | NO SURFACE LAYER |
| 5 | YES | 28.5 | 45 | 55 | 93-127 | 36-79 | PEEK | NO SURFACE LAYER |
| 6 | YES | 28.5 | 95 | 5 | 93-127 | 36-79 | PEEK | NO SURFACE LAYER |
| 7 | YES | 25.5 | 72.5 | 27.5 | 158-225 | 36-79 | PEEK | NO SURFACE LAYER |
| 8 | YES | 22.0 | 72.5 | 27.5 | 93-127 | 36-79 | PEEK | 10.2 |
| 9 | YES | 29.0 | 72.4 | 27.6 | 93-127 | 36-79 | PEEK | 10.2 |
| 10 | YES | 22.5 | 72.4 | 27.6 | 93-127 | 36-79 | PEEK | 10.2 |
| 11 | YES | 28.5 | 72.6 | 27.4 | 93-127 | 36-79 | PEEK | 10.2 |
| 12 | YES | 20 | 100 | — | 93-127 | — | PEEK | 10.2 |
| 13 | YES | 23 | 100 | — | 93-127 | — | PEEK | 10.2 |
| 14 | YES | 22.5 | 72.4 | 27.6 | 93-127 | 36-79 | PEEK | 0.9 |
| 15 | YES | 28.5 | 72.6 | 27.4 | 93-127 | 36-79 | PEEK | 25.0 |

| Comp. ex. | Corona treatment (W·min/m$^2$) | Screw rotation (rpm) in 2ND mixing step | Apparent viscosity (Pa·s) | Surface resistivity ρs at URS 1000 V | Volume resistivity ρv at UR 100 V | Δ Tm |
|---|---|---|---|---|---|---|
| 1 | NO CORONA TREATMENT | 225 | 1700 | 3.0E+12 | 2.0E+12 | 6.4 |
| 2 | NO CORONA TREATMENT | 225 | 2400 | 8.0E+08 | 2.0E+08 | 7.7 |
| 3 | NO CORONA TREATMENT | 300 | 2450 | 8.0E+11 | 8.0E+10 | 8.0 |
| 4 | NO CORONA TREATMENT | 225 | 2100 | 1.2E+10 | 8.0E+09 | 7.0 |
| 5 | NO CORONA TREATMENT | 225 | 2000 | 3.0E+12 | 2.0E+12 | 7.0 |
| 6 | NO CORONA TREATMENT | 225 | 2350 | 8.0E+08 | 2.0E+08 | 7.4 |
| 7 | NO CORONA TREATMENT | 225 | 2200 | 8.0E+08 | 2.0E+10 | 7.0 |
| 8 | 100 | 225 | 1700 | 8.0E+12 | 2.0E+12 | 6.4 |
| 9 | 100 | 225 | 2400 | 8.0E+08 | 1.0E+08 | 7.7 |
| 10 | 230 | 225 | 1770 | 1.0E+13 | 2.0E+12 | 5.5 |
| 11 | 30 | 225 | 2310 | 8.0E+08 | 2.0E+08 | 6.8 |
| 12 | 100 | 225 | 1400 | 3.0E+11 | 2.0E+12 | 4.6 |
| 13 | 100 | 225 | 1530 | 8.0E+08 | 9.4E+09 | 4.9 |

TABLE 2-continued

| | | | | | | |
|---|---|---|---|---|---|---|
| 14 | 100 | 225 | 1770 | 1.0E+13 | 2.0E+12 | 5.5 |
| 15 | 100 | 225 | 2310 | 8.0E+08 | 2.0E+08 | 6.8 |

TABLE 3

| | Image evaluation result | | |
|---|---|---|---|
| | Anti-scattering | Anti-ghost | Anti-white-spot |
| EMB. 1 | A | A | A |
| EMB. 2 | A | B | A |
| EMB. 3 | B | A | A |
| EMB. 4 | A | A | A |
| EMB. 5 | B | B | A |
| EMB. 6 | B | B | A |
| EMB. 7 | A | A | A |
| EMB. 8 | A | B | A |
| EMB. 9 | B | A | A |
| EMB. 10 | A | A | B |
| EMB. 11 | B | B | A |
| EMB. 12 | B | B | A |
| EMB. 13 | A | B | A |
| EMB. 14 | B | A | A |
| EMB. 15 | A | B | A |
| EMB. 16 | B | A | A |
| COMP. EX. 1 | A | D | A |
| COMP. EX. 2 | D | A | D |
| COMP. EX. 3 | A | B | D |
| COMP. EX. 4 | D | A | B |
| COMP. EX. 5 | B | D | A |
| COMP. EX. 6 | D | B | C |
| COMP. EX. 7 | D | B | B |
| COMP. EX. 8 | A | D | A |
| COMP. EX. 9 | D | A | D |
| COMP. EX. 10 | A | D | A |
| COMP. EX. 11 | D | A | A |
| COMP. EX. 12 | A | D | A |
| COMP. EX. 13 | D | A | A |
| COMP. EX. 14 | A | D | A |
| COMP. EX. 15 | D | A | A |

4-2. Evaluation Result of Image

An evaluation result is shown in Table 3 above. As regards the image X, when the character string was enlarged by and observed through an optical microscope or the like, the scattering of the toner image was observed in several cases. A toner image scattering mechanism would be considered as follows. In the primary transfer step, it is ideal that the toner image is transferred in a region where the photosensitive drum and the intermediary transfer belt physically contact each other. However, in the case where the surface resistivity of the intermediary transfer belt is low, a surface potential of the intermediary transfer belt becomes high also in an outside of the region where the photosensitive drum and the intermediary transfer belt physically contact each other. As a result, it would be considered that the toner image is scattered by transferring (pre-transferring) the toner (image) from the photosensitive drum onto the intermediary transfer belt before the photosensitive drum contacts the intermediary transfer belt. From the above-described reason, it would be considered that scattering occurred in the case where the surface resistivity of the intermediary transfer belt is set at a low value. From Tables 1 to 3, it is understood that there is a need that the surface resistivity $\rho s$ of the intermediary transfer belt is $1.0 \times 10^9$ $\Omega$/square or more. On the other hand, the surface resistivity $\rho s$ of the intermediary transfer belt is $2 \times 10^{12}$ $\Omega$/square or less from the viewpoint of suppression of an increase of the volume resistivity $\rho v$ of the intermediary transfer belt with increasing surface resistivity $\rho s$ or from the like viewpoint. That is, the surface resistivity $\rho s$ of the intermediary transfer belt may desirably be $1 \times 10^9$-$2 \times 10^{12}$ $\Omega$/square.

Further, at the time when about $100 \times 10^3$ sheets were passed through the fixing device, with respect to the image Y, the ghost occurred on the third sheet and the later of the continuous 5 sheets in several cases. A ghost occurrence mechanism would be considered as follows. The volume resistivity of the intermediary transfer belt gradually increases due to abrasion or the like by repetition of image formation. When the volume resistivity increases, the electric charges accumulated on the intermediary transfer belt by the secondary transfer do not readily attenuate, and when the primary transfer is carried out in the neighborhood of a portion where the residual electric charges are accumulated, image disturbance is caused to occur. As regards the first and second sheets, an intermediary transfer belt portion passing through the secondary transfer portion during application of the secondary transfer bias to the intermediary transfer belt does not overlap with a portion where the subsequent image is to be transferred and therefore is not influenced by the residual electric charges. On the other hand, it would be considered that the ghost is visualized by carrying out the primary transfer in a manner that as regards the third sheet and later, the intermediary transfer belt portion passes through a region including a portion where the secondary transfer bias is applied and a portion (sheet interval) where the secondary transfer bias is not applied, i.e., a region including a portion where the residual electric charges exist and a portion where the residual electric charges do not exist. From the above-described reason, it would be considered that the ghost occurred in the durability test in the case where the volume resistivity of the intermediary transfer belt is set at a high value. From Tables 1 to 3, it is understood that there is a need that the volume resistivity $\rho v$ of the intermediary transfer belt is $1 \times 10^{12}$ $\Omega \cdot$cm or less. Further, from Tables 1 to 3, it is understood that there is a need that $\log_{10}(\rho s/\rho v)$ is 0.2 or more. Incidentally, the volume resistivity $\rho v$ is typically $3.0 \times 10^8$ $\Omega \cdot$cm or more. Further, $\log_{10}(\rho s/\rho v)$ is 1 or less (typically, 0.96 or less) in general.

Further, with respect to the image Y, the white spot of 1 mm or more in diameter was observed in several cases. A white spot occurrence mechanism would be considered as follows. When the apparent viscosity of the resin composition constituting the base layer of the intermediary transfer belt becomes high, shearing heat generation becomes large, and thermal decomposition or thermal deterioration of the resin material occurs, so that the resin deterioration degree $\Delta$Tm becomes large. Then, aggregate generates in the intermediary transfer belt and forms a local projection and is locally high in electric resistance value compared with another in-plane portion, so that a current necessary to transfer the toner image does not sufficiently flow. For that reason, it would be considered that when the image is formed in the neighborhood of the above-described projection on the intermediary transfer belt, local transfer void, i.e., the white spot occurs. From the above-described reason, it would be considered that in the case where the apparent viscosity is high and $\Delta$Tm is large, the above-described projection exists on the intermediary transfer belt and thus a white spot image generates. From Tables 1 to 3, it is understood that the apparent viscosity of the resin material constituting the base layer of the intermediary transfer belt may preferably be 2310 Ps·s or less. Incidentally, the apparent viscosity of the resin material constituting the base layer of the intermediary transfer belt is typically 1770 Pa·s or more. Further, from Tables 1 to 3, it is understood that the resin deterioration degree (ΔTm) of the resin material constituting the base layer of the intermediary transfer belt may preferably be 7.5 or less. Incidentally, the resin deterioration degree (ΔTm) of the resin material constituting the base layer of the intermediary transfer belt is typically 5.5 or more.

In Embodiments 1 to 16, all the evaluation results of the scattering, the ghost and the white spot were satisfactory ones.

As described above, according to the above-described Embodiments, by setting a ratio between the surface resistivity and the volume resistivity so as to fall within an appropriate range, it becomes possible to suppress the scattering and the ghost while suppressing the thermal deterioration (spot image) of the resin material.

According to the present invention, the scattering and the ghost can be suppressed while suppressing the thermal deterioration (spot image) of the resin material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133763 filed on Jul. 13, 2018, which is hereby incorporated by reference herein in its entirety.

What is claimed is:

1. An intermediary transfer belt having surface resistivity $\rho s$ of $1 \times 10^9$ Ω/square or more and volume resistivity $\rho v$ of $1 \times 10^{12}$ Ω·cm or less, said intermediary transfer belt comprising:
   a thermoplastic resin material containing carbon black,
   wherein said carbon black contained in said thermoplastic resin material has a weight ratio of 22.5-28.5 weight % and include first carbon black and second carbon black, and
   wherein said first carbon black of the carbon black contained in the thermoplastic resin material has a weight ratio of 50-90 weight % and dibutyl phthalate absorption of 93-127 ml/100 g, and said second carbon black of the carbon black contained in the thermoplastic resin material has a weight ratio of 10-50 weight % and dibutyl phthalate absorption of 36-79 ml/100 g.

2. An intermediary transfer belt according to claim 1, where the surface resistivity $\rho s$ of said intermediary transfer belt is $2 \times 10^{12}$ Ω/square or less.

3. An intermediary transfer belt according to claim 1, further comprising a surface layer on said thermoplastic resin material.

4. An intermediary transfer belt according to claim 3, wherein said surface layer is made of an acrylic resin material containing electroconductive fine particles.

5. An intermediary transfer belt according to claim 3, wherein said surface layer contains perfluoropolyether in said acrylic resin material.

6. An intermediary transfer belt according to claim 1, wherein said thermoplastic resin material is polyether ether ketone.

7. An image forming apparatus comprising:
   an image bearing member configured to bear a toner image; and
   an intermediary transfer belt, according to claim 1, configured to carry and convey the toner image primary-transferred from said image bearing member to secondary-transfer the toner image onto a recording material.

* * * * *